(12) United States Patent
Ammanur et al.

(10) Patent No.: US 9,020,894 B2
(45) Date of Patent: Apr. 28, 2015

(54) SERVICE VERSION MODIFICATION OF A HIGH-AVAILABILITY SYSTEM

(75) Inventors: Rajagopalan M. Ammanur, San Jose, CA (US); Pradosh Mohapatra, Fremont, CA (US); Satyajeet Randhawa, Livermore, CA (US); Anthony Joseph Li, Los Altos, CA (US); Akash R. Deshpande, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/357,513

(22) Filed: Jan. 24, 2012

(65) Prior Publication Data

US 2013/0191340 A1 Jul. 25, 2013

(51) Int. Cl.
| | | |
|---|---|---|
| *G06F 17/00* | (2006.01) | |
| *G06F 7/00* | (2006.01) | |
| *G06F 11/14* | (2006.01) | |
| *G06F 11/20* | (2006.01) | |
| *G06F 9/455* | (2006.01) | |

(52) U.S. Cl.
CPC .............. *G06F 7/00* (2013.01); *G06F 11/2097* (2013.01); *G06F 11/2038* (2013.01); *G06F 9/45533* (2013.01); *G06F 11/14* (2013.01)

(58) Field of Classification Search
USPC ............... 714/55, 15, 4.12; 718/100; 707/638
See application file for complete search history.

(56) References Cited

U.S. PATENT DOCUMENTS

| | | | |
|---|---|---|---|
| 7,028,217 B2 * | 4/2006 | Franckowiak et al. ......... 714/11 |
| 7,043,444 B2 * | 5/2006 | Ojha et al. .................. 705/7.25 |
| 7,293,200 B2 * | 11/2007 | Neary et al. ..................... 714/35 |
| 7,783,914 B1 * | 8/2010 | Havemose .................... 714/4.11 |
| 7,843,906 B1 * | 11/2010 | Chidambaram et al. ...... 370/386 |
| 7,843,907 B1 * | 11/2010 | Abou-Emara et al. ........ 370/386 |
| 7,894,334 B2 * | 2/2011 | Wen et al. ..................... 370/217 |
| 7,990,994 B1 * | 8/2011 | Yeh et al. ...................... 370/431 |
| 8,006,129 B2 * | 8/2011 | Banks et al. .................... 714/10 |
| 8,037,367 B1 * | 10/2011 | Havemose ...................... 714/55 |
| 8,122,280 B2 * | 2/2012 | Ngan et al. ....................... 714/1 |
| 8,176,364 B1 * | 5/2012 | Havemose ....................... 714/15 |
| 8,392,496 B2 * | 3/2013 | Linden et al. ................. 709/201 |
| 8,402,305 B1 * | 3/2013 | Havemose ................... 714/4.12 |
| 8,458,534 B1 * | 6/2013 | Havemose ...................... 714/55 |
| 2005/0036485 A1 * | 2/2005 | Eilers et al. ................... 370/389 |
| 2006/0078092 A1 * | 4/2006 | Amidi .......................... 379/9.05 |
| 2006/0159010 A1 * | 7/2006 | Yamaguchi et al. .......... 370/216 |
| 2007/0094659 A1 * | 4/2007 | Singh et al. ....................... 718/1 |

(Continued)

*Primary Examiner* — Jean M Corrielus

(74) *Attorney, Agent, or Firm* — The Law Office of Kirk D. Williams

(57) ABSTRACT

In one embodiment, an operating system kernel and/or one or more processes of a high-availability system are modified while the system is operating and providing high-availability service. In accomplishing this, one embodiment uses a second virtual machine to operate a second operating system kernel including a second set of processes in the standby mode, which receive state information from corresponding process(es) in the active mode. Individually, the operating system kernel and processes within the second set of processes may be a same or different version of their counterpart in a first virtual machine and its processes which are being replaced. When the second set of processes have acquired sufficient state information to perform the standby role, the operation of the first virtual machine is typically ceased as the version modified second virtual machine is performing the version modified functionality of the first virtual machine.

22 Claims, 5 Drawing Sheets

(56) References Cited

U.S. PATENT DOCUMENTS

| | | |
|---|---|---|
| 2008/0080512 A1 | 4/2008 | Gofman et al. |
| 2008/0189468 A1* | 8/2008 | Schmidt et al. .................. 711/6 |
| 2009/0106439 A1 | 4/2009 | Twitchell, Jr. |
| 2009/0327392 A1 | 12/2009 | Tripathi et al. |
| 2010/0011245 A1* | 1/2010 | Talaugon et al. ............... 714/21 |
| 2010/0039932 A1* | 2/2010 | Wen et al. .................... 370/217 |
| 2010/0040205 A1* | 2/2010 | Amidi ......................... 379/9.05 |
| 2010/0042869 A1* | 2/2010 | Szabo et al. ...................... 714/4 |
| 2010/0093433 A1 | 4/2010 | Tomicic et al. |
| 2010/0162036 A1* | 6/2010 | Linden et al. .................... 714/4 |
| 2010/0162383 A1* | 6/2010 | Linden et al. ................... 726/13 |
| 2010/0169446 A1* | 7/2010 | Linden et al. ................. 709/206 |
| 2010/0229029 A1* | 9/2010 | Frazier, II ......................... 714/5 |
| 2010/0281296 A1* | 11/2010 | Talaugon et al. .................. 714/4 |
| 2010/0287548 A1 | 11/2010 | Zhou et al. |
| 2010/0293543 A1 | 11/2010 | Erhart et al. |
| 2011/0185221 A1* | 7/2011 | Talaugon et al. ............. 714/4.11 |
| 2012/0023309 A1* | 1/2012 | Abraham et al. ............... 712/30 |
| 2013/0117766 A1* | 5/2013 | Bax et al. ...................... 719/323 |
| 2013/0151646 A1* | 6/2013 | Chidambaram et al. ...... 709/213 |
| 2013/0191340 A1* | 7/2013 | Ammanur et al. ............ 707/638 |
| 2013/0191831 A1* | 7/2013 | Goyal et al. ................... 718/100 |

* cited by examiner

SERVICE VERSION MODIFICATION OF A HIGH-AVAILABILITY SYSTEM

TECHNICAL FIELD

The present disclosure relates generally to in service version modification of a high-availability system, such as, but not limited to routing or control plane functionality in a packet switching device.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

From time to time, the software running in packet switching devices needs to be upgraded. However, this is problematic as taking the entire packet switch device or portions thereof offline cause packets to be lost during the upgrade process. Such upgrades impact service provider business by reducing the availability of their networks, thereby affecting the Service Level Agreements with their customers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
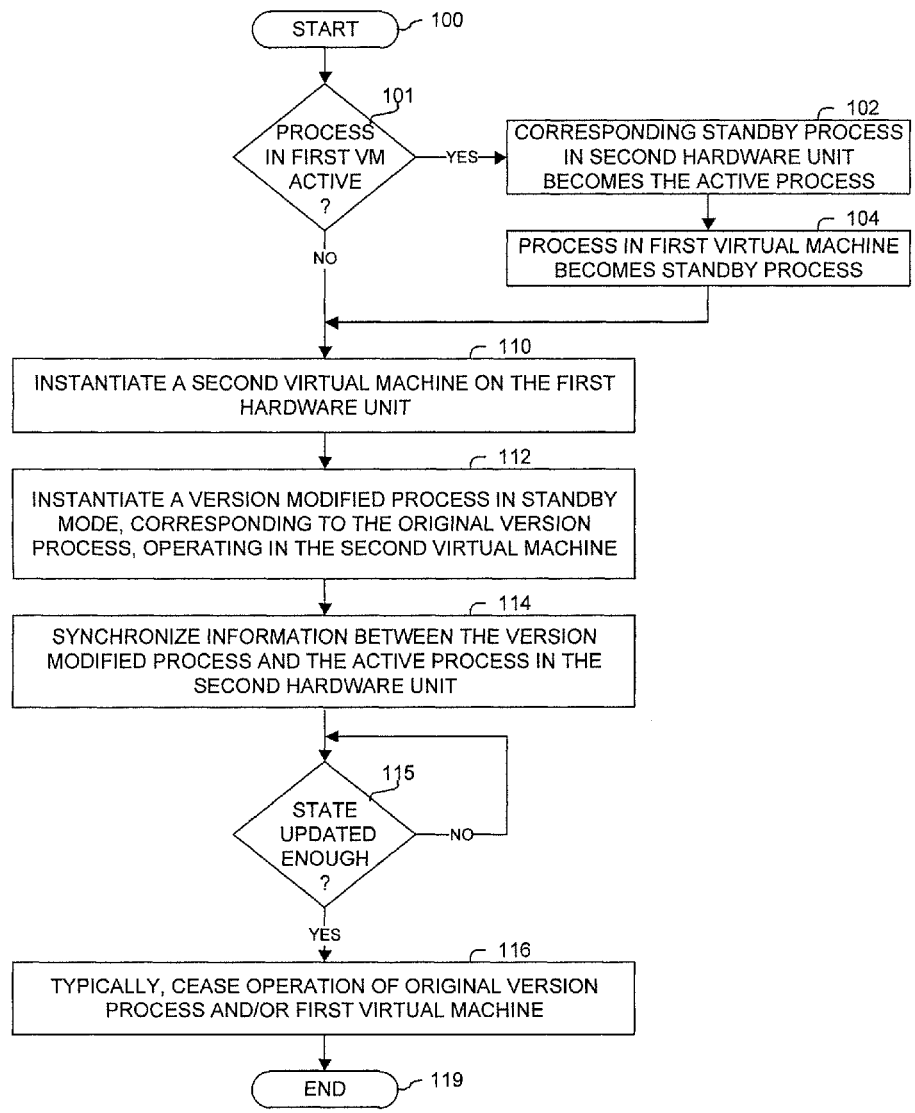
FIG. 1 illustrates a process according to one embodiment.

Disclosed are, inter alia, methods, apparatus, computer-storage media, mechanisms, and means associated with in service version modification of a high-availability system. In one embodiment of a high-availability system, virtual machines operate on different hardware units (e.g., within a same or different hardware platform). Processes are distributed in some manner among these virtual machines, with certain of these processes designated as being in the active mode and performing certain functionality, and with corresponding one or more standby processes having sufficient state information to be able to become the active process in place of the current (e.g., in case of failure, maintenance). Additionally, one embodiment updates the processes operating within a virtual machine and/or the operating system kernel of the virtual machine while maintaining the high-availability of the system.

One embodiment includes: a method, comprising: instantiating a version modified process in a standby role on a second virtual machine on a first hardware unit, which is operating a first virtual machine including an original version process in a standby role; wherein the version modified process corresponds to a different version of the original version process; synchronizing state information between the version modified process and a second process operating in an active role on a second hardware unit, with the second hardware unit being different than the first hardware unit; and ceasing said operating of the original version process after the version modified process is able to take over an active role being performed by the second process.

In one embodiment, prior to said operation of synchronizing state information between the version modified process and a second process: the role of the original version process is changed from an active role to a standby role, and changing the role of the second process from a standby role to an active role. In one embodiment, said operations of instantiating the version modified process, synchronizing state information, and ceasing said operating of the original version process are performed as a result of an initiating of an operation for changing from the original version process to the version modified process.

In one embodiment, the second process is operating in a virtual machine on the second hardware unit. One embodiment includes concurrently with said operation of synchronizing state information between the version modified process and the second process: synchronizing state information between the original version process and the second process. In one embodiment, the second virtual machine is operating a modified version of an operating system kernel which is different than an original version of the operating system kernel operating in the first virtual machine. In one embodiment, the second virtual machine is operating an operating system kernel that is different than the operating system kernel operating in the first virtual machine.

One embodiment performs a method, comprising: for each particular first process of one or more first processes operating in a first virtual machine on a first hardware unit: changing the role of said particular first process from an active role to a standby role, and changing the role of a second process, of one or more second processes on a hardware unit different than the first hardware unit, corresponding to said particular first process from a standby role to an active role; instantiating a third process corresponding to each of said one or more first processes resulting in one or more third processes in a standby role on a second virtual machine on the first hardware unit; and synchronizing state information between corresponding processes of said one or more third processes and said one or more second processes to enable said one or more third processes to be able to take over an active role being performed by a corresponding one of said one or more second processes; wherein said operation of synchronizing state information is performed after said operations of changing the role.

One embodiment ceases said operating of each identifiable first process of said one or more first processes in response to a corresponding one of said one or more third processes being able to take over an active role being performed by a corresponding one of said one or more second processes. One embodiment includes: instantiating a fourth process in the second virtual machine corresponding to a current standby process operating in the first virtual machine and a current active process operating in a hardware unit different than the first hardware unit; and synchronizing state information between the fourth process and the current active process; and ceasing said operating of the current standby process in response based on the fourth process being able to take over the active role being performed by the current active process.

In one embodiment, at least one of said one or more third processes corresponds to a different version of a corresponding one of said one or more first processes. In one embodiment, said operations of changing the role, and said operations of instantiating said one or more third processes and said synchronizing state information are performed as a result of an initiating of an operation for changing from said one or more first processes to said one or more third processes. One embodiment includes: concurrently with said operation of synchronizing state information between corresponding processes of said one or more third processes and said one or more second processes: synchronizing state information between corresponding processes of said one or more first processes and said one or more second processes.

In one embodiment, the second virtual machine is operating a modified version of an operating system kernel which is different than an original version of the operating system kernel operating in the first virtual machine. One embodiment includes: instantiating the second virtual machine prior to said operation of instantiating said one or more third processes; and ceasing operation of said first virtual machine in response to all of said one of said one or more third processes being able to take over an active role being performed by a corresponding one of said one or more second processes.

In one embodiment, the second virtual machine is operating an operating system kernel that is different than the operating system kernel operating in the first virtual machine. In one embodiment, said one or more first processes includes at least two processes.

2. Description

Disclosed are, inter alia, methods, apparatus, computer-storage media, mechanisms, and means associated with in service version modification of a high-availability system. An application performed by one embodiment may include, but is not limited to, using virtual machines to operate routing and/or control processes within a packet switching device or using virtual machines to operate compute nodes, and changing the operating version of one or more processes and/or operating system kernels while maintaining a high-availability system.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

An application performed by one embodiment may include, but is not limited to, using virtual machines to operate routing, control and/or application processes within a packet switching device or using virtual machines to operate compute nodes, and changing the operating version of one or more processes and/or operating system kernels while maintaining a high-availability system.

In one embodiment of a high-availability system, virtual machines operate on different hardware units (e.g., within a same or different hardware platform). Processes are distributed in some manner among these virtual machines, with certain of these processes designated as being in the active mode and performing certain functionality, and with corresponding one or more standby processes having sufficient state information to be able to become the active process in place of the current (e.g., in case of failure, maintenance). Additionally, one embodiment updates the processes operating within a virtual machine and/or the operating system kernel of the virtual machine while maintaining the high-availability of the system.

Expressly turning to the figures, FIG. 1 illustrates a process performed in one embodiment for performing in service version modification of a high-availability system. The high-available system includes a first virtual machine operating on a first hardware unit and an original version process (active or standby) operating therein, and a process (standby or active) operating in a second hardware platform (typically operating in a virtual machine) such that there is process-level redundancy between the process in the first virtual machine and between a process on the second hardware unit. In one embodiment, the process on the second hardware platform is operating in a virtual machine. In one embodiment, the process on the second hardware platform is not operating in a virtual machine.

In response to the initiation of an upgrade of a process in the first virtual machine and/or the operating system kernel of the first virtual machine, processing of the flow diagram of FIG. 1 commences with process block 100. As determined in process block 101, if the process in the first virtual machine is operating in the active mode (e.g., in contrast to the standby mode), then in process block 102, the corresponding process in the second hardware unit takes over as the active process (e.g., switches to the active mode). As indicated by process block 104, the active process in the first virtual machine changes to operate in the standby mode. In the standby mode, a process continues to update state information with the active process, so that it can take over as the active process should the current active process fail or otherwise be unable to perform the tasks required of the active mode process.

In process block 110, a second virtual machine is instantiated on the first hardware unit (e.g., unless the second virtual machine is already operating on the first hardware unit). In process block 112, a version modified process is instantiated in the second virtual machine to operate in a standby mode. The version modified process corresponds to the original version process operating in the first virtual machine. Typically, the version modified process is an upgraded or downgraded version of the original version process. Although, such as when only the operating system kernel of the first virtual machine is being upgraded, the version modified process may operate the same version as the original version process. Also, the operating system kernel of the first and second virtual machines may be the same or different kernel versions, or even different kernels (e.g., corresponding to different operating systems).

In process block 114, information is synchronized between the version modified process and the active process operating in the second hardware unit. As discussed supra, the original version process (now in standby mode) continues to update state information with the active process operating in the second hardware unit. In this manner, the active process communicates state information to both the original version process (operating in standby mode) and the version modified process (operating in standby mode). If a failure of the active process occurs during this operation prior to the version modified process acquiring enough state information to switch to the active mode, then the original version process can switch from standby mode to active mode to perform the active mode functionality, thus, providing high-availability of the system.

As determined in process block 115, when the version modified process has acquired enough state information to be able to switch to the active mode, then typically process block 116 is performed, wherein operation of original version process and/or first virtual machine is ceased as the version modified process operating in the second virtual machine can perform the functionality performed by the original version process. Processing of the flow diagram of FIG. 1 is complete as indicated by process block 119.

Figure 2A:
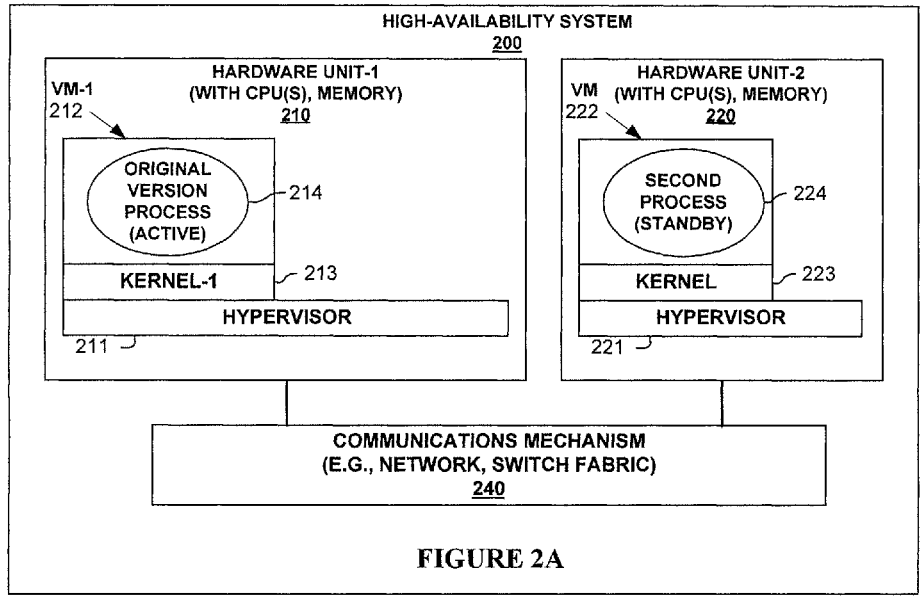
FIG. 2A-D illustrate an operation of a system according to one embodiment.

Turning first to FIG. 2A of FIGS. 2A-D, illustrated is a high-availability system 200 progressing through various processing associated with in service version modification while maintaining high availability. High-availability system 200 includes a first hardware unit 210 and a second hardware unit 220 communicatively coupled via communications mechanism 240 (e.g., network, switch fabric, or other mechanism). In one embodiment, first and second hardware units (210, 220) are part of physically different appliances. In one embodiment, first and second hardware units (210, 220) are physically different hardware units within a single appliance (e.g., different cards or boards within a packet switching device, computing node, or other device). In one embodiment, first and second hardware units (210, 220) are physically different hardware units within a card or board.

As shown, operating on hardware unit 210 is a hypervisor 211, on top of which a first virtual machine 212 is operating. First virtual machine 212 includes operating system kernel-1 (213) on top of which original version process 214 is operating in the active mode. Also as shown, operating on hardware unit 220 is a hypervisor 221, on top of which a virtual machine 222 is operating. Virtual machine 222 includes operating system kernel (223) on top of which second process 224 is operating in the standby mode. Original version process 214 and second process 224 share information and otherwise coordinate to provide a high-availability system as if a process 214, 224 currently in an active mode fails, then the process 224, 214 at that time in a standby mode takes over by switching to the active mode and performing the active mode processing.

For purposes of this example configuration, FIG. 2A illustrates original version process 214 in the active mode, and second process 224 in the standby mode.

Figure 2B:
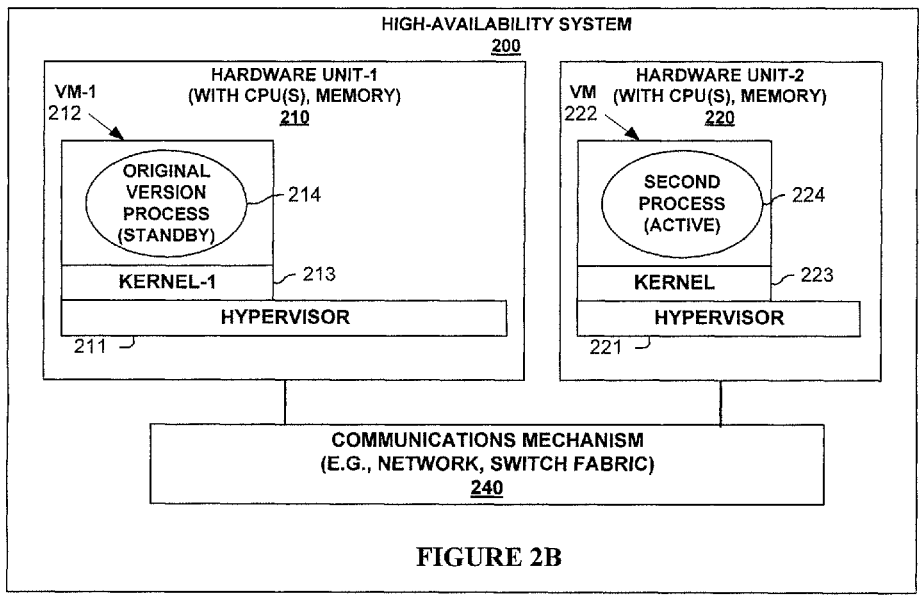

Next, shown in FIG. 2B is high-availability system 200, with original version process 214 now in the standby node and second process 224 in the active mode. The processing illustrated between FIGS. 2A-2B is that original version process (and any other processes) in virtual machine 212 are switched into a standby mode.

In one embodiment, high-availability system 200 is in the configuration of FIG. 2A when the modifying one or more operating versions is initiated. In one embodiment, high-availability system 200 is in the configuration of FIG. 2B when the modifying one or more operating versions is initiated.

Figure 2C:
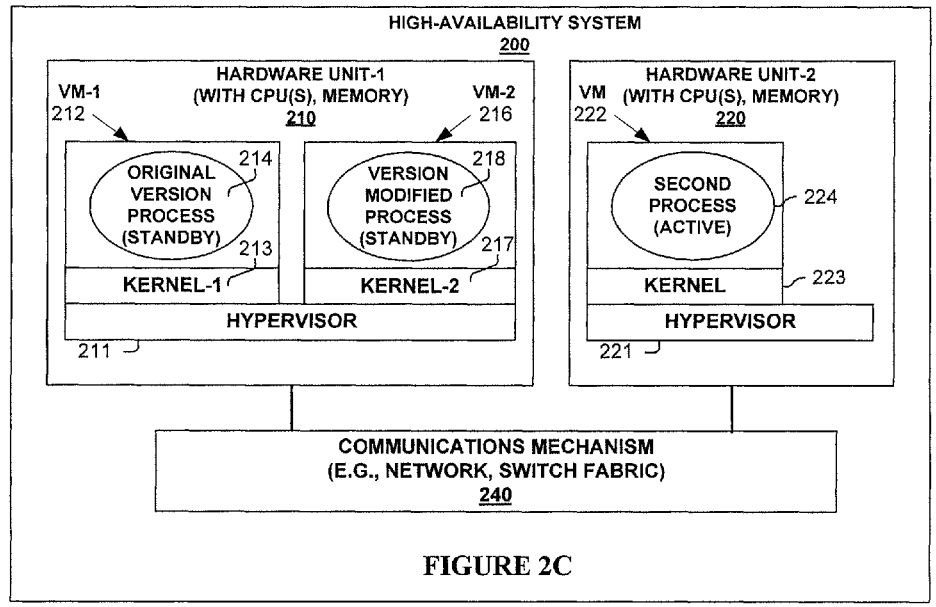

FIG. 2C illustrates the addition of a second virtual machine 216 operating on hardware unit-1 (210), with a version modified process 218 initiated to operate in a standby state. Kernel-2 (217) corresponds to kernel-1 (213). Kernel-2 (217) can be an upgraded, downgraded or the same version of kernel-1 (213), or possibly even a different operating system. Version modified process 218 corresponds to original version process 214. Version modified process 218 can be an upgraded, downgraded or the same version of original version process 214.

Original version process 214 (in standby mode) communicates with second process 224 (in active mode) to continue to receive state information which would allow original version process 214 to switch to the active mode to take over the active mode from second process 224. Version modified process 218 (in standby mode) communicates with second process 224 (in active mode) in order to receive state information which would allow original version process 214 to switch to the active mode to take over the active mode from second process 224 once it has acquired sufficient state information.

Figure 2D:
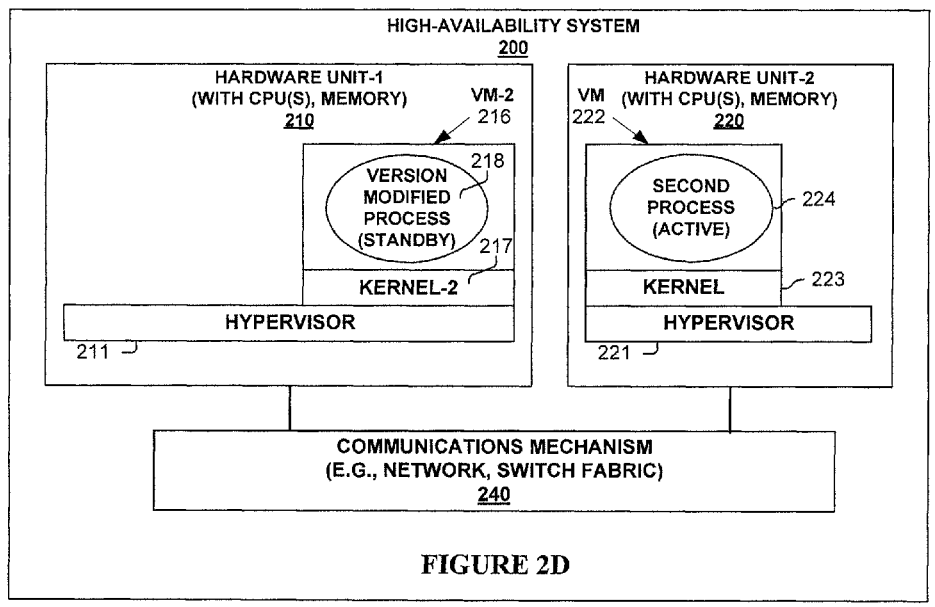

Eventually, both original version process 214 and version modified process 218 will be able to switch to the active role and take over for second process 224, should the need arise. After (or in response to such a condition), high-availability system 200 will typically cease the operation of virtual machine-1 (212) and original version process 214, as virtual machine-2 (216) and version modified process 218 can perform the standby functionality, thus in one embodiment, obsoleting the need for virtual machine-1 (212) and original version process 214. This configuration is illustrated in FIG. 2D.

Figure 3:
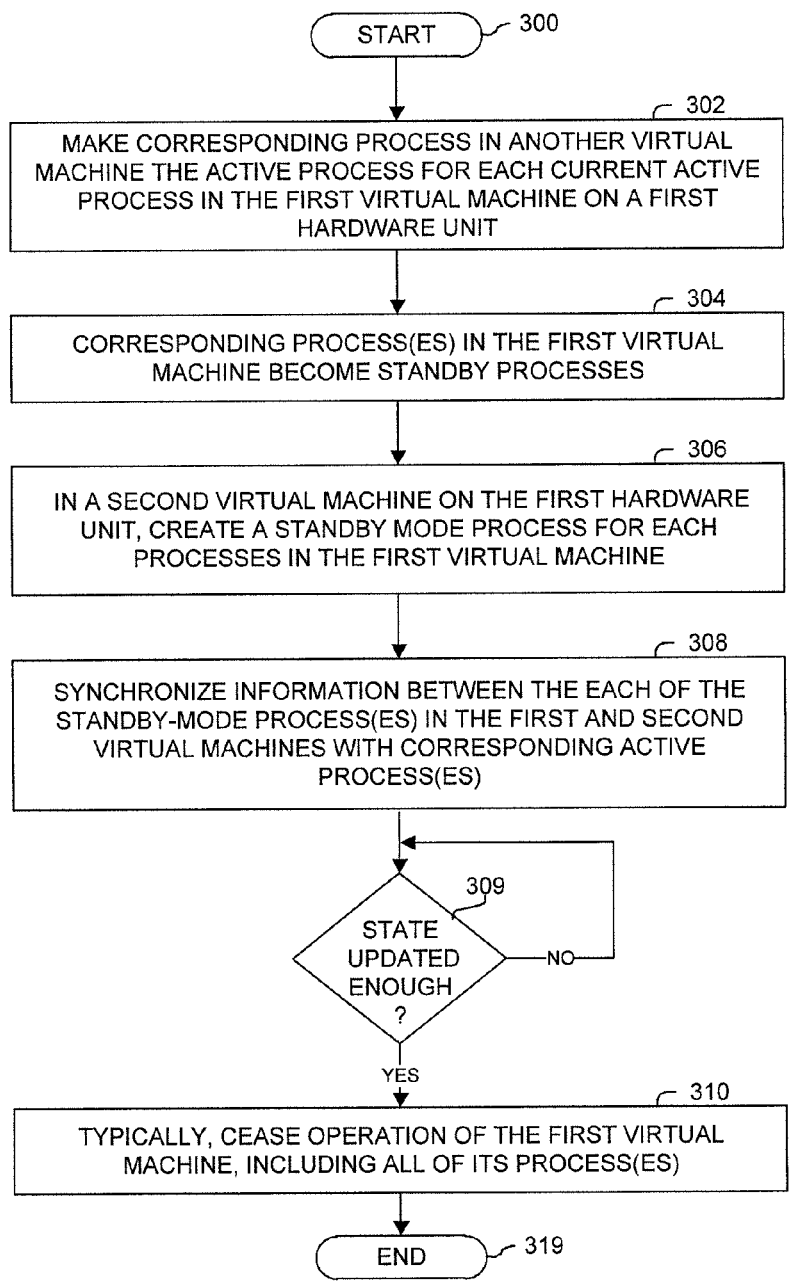
FIG. 3 illustrates a process according to one embodiment.

FIG. 3 illustrates a process performed in one embodiment for performing in service version modification of a high-availability system. The high-available system includes a first virtual machine operating on a first hardware unit and original version process(es) (active or standby) operating therein, and process(es) (standby or active) operating in a second hardware platform (typically operating in a virtual machine) such that there is process-level redundancy between each process in the first virtual machine and between a process on the second hardware unit. In one embodiment, the process(es) operating on the second hardware platform are operating in one or more virtual machines. In one embodiment, one or more of the process(es) operating on the second hardware platform are not operating in a virtual machine.

In response to the initiation of an upgrade of a process in the first virtual machine and/or the operating system kernel of the first virtual machine, processing of the flow diagram of FIG. 3 commences with process block 300. In process blocks 302, each standby process in another virtual machine that corresponds to an active process in the first virtual machine is switched to an active role. As indicated by process block 304, the active process(es) in the first virtual machine changes to operate in the standby mode. In the standby mode, a process continues to update state information with the active process, so that it can take over as the active process should the current active process fail or otherwise be unable to perform the tasks required of the active mode process.

In process block 306, in a second virtual machine (possibly with a different or modified version kernel), process(es) in the standby mode are created and operated for each of the processes in the first virtual machine. In process block 308, information is synchronized between the each of the standby-mode process(es) in the first and second virtual machines with corresponding active process(es). As discussed supra, the original version process(es) (now in standby mode) continue to update state information with their corresponding active process operating. In this manner, each active process communicates state information to both the original version process (operating in standby mode) and the version modified process (operating in standby mode). If a failure of an active process occurs prior to a corresponding version modified process acquiring enough state information to switch to the active mode, then the original version process can switch from standby mode to active mode to perform the active mode functionality, thus, providing high-availability of the system.

As determined in process block 309, when all of the standby processes in the second virtual machine have acquired enough state information to be able to switch to an active mode and perform the active mode functionality, then process block 310 is typically performed, in which the operation of the first virtual machine, including all of its process(es), is ceased. Processing of the flow diagram of FIG. 3 is complete as indicated by process block 319.

Figure 4:
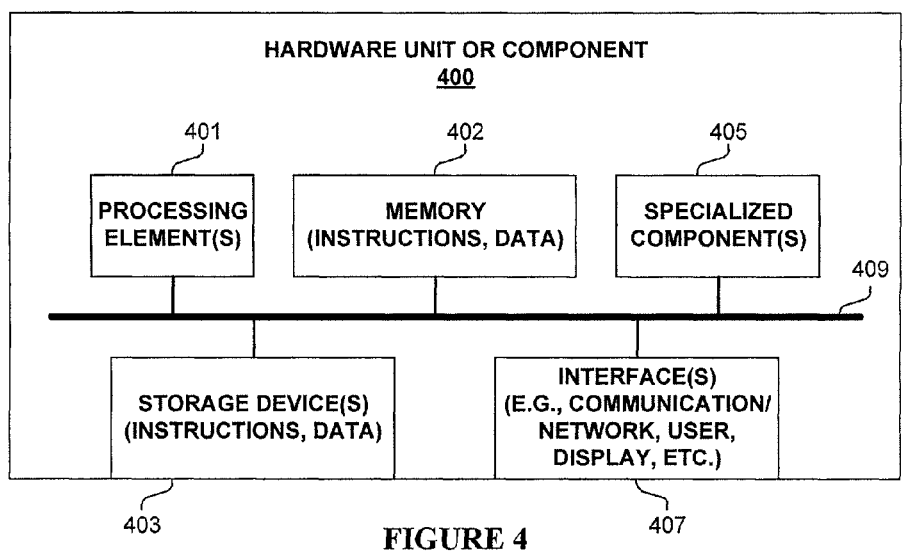
FIG. 4 illustrates an hardware unit or component configured according of one embodiment.

FIG. 4 illustrates a hardware unit or component 400 configured to operate, and/or operating, according to one embodiment associated with in service version modification of a high-availability system. In one embodiment, hardware unit or component 400 performs one or more processes corresponding to one of the flow diagrams illustrated or otherwise described herein, and/or illustrated in another diagram or otherwise described herein.

In one embodiment, hardware unit or component 400 includes one or more processing element(s) 401, memory 402, storage device(s) 403, specialized component(s) 405 (e.g. optimized hardware such as for performing operations, etc.), and interface(s) 407 for communicating information (e.g., sending and receiving packets, user-interfaces, displaying information, etc.), which are typically communicatively coupled via one or more communications mechanisms 409, with the communications paths typically tailored to meet the needs of a particular application. In one embodiment, hardware unit or component 400 corresponds to hardware unit-1 (210), hardware unit-2 (220), or other part of high-availability system 200 of FIGS. 2A-D.

Various embodiments of hardware unit or component 400 may include more or fewer elements. The operation of hardware unit or component 400 is typically controlled by processing element(s) 401 using memory 402 and storage device(s) 403 to perform one or more tasks or processes. Memory 402 is one type of computer-readable/computer-storage medium, and typically comprises random access memory (RAM), read only memory (ROM), flash memory, integrated circuits, and/or other memory components. Memory 402 typically stores computer-executable instructions to be executed by processing element(s) 401 and/or data which is manipulated by processing element(s) 401 for implementing functionality in accordance with an embodiment. Storage device(s) 403 are another type of computer-readable medium, and typically comprise solid state storage media, disk drives, diskettes, networked services, tape drives, and other storage devices. Storage device(s) 403 typically store computer-executable instructions to be executed by processing element(s) 401 and/or data which is manipulated by processing element(s) 401 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

operating a first virtual machine including an original version process in a standby role on a first hardware unit and a second process operating in an active role on a second hardware unit, with the second hardware unit being different than the first hardware unit, and synchronizing state information between the second process and the original version process;

instantiating a version modified process in a standby role on a second virtual machine on the first hardware unit such that the version modified process and the original version process are simultaneously operating with the original version process configured to become the active process until the version modified process is ready to take over an active role being performed by the second process; wherein the version modified process corresponds to a different version of the original version process; and synchronizing state information between the version modified process and the second process and in response to the version modified process being ready to take over an active role being performed by the second process, configuring the version modified process to take over an active role being performed by the second process instead of the original version process.

2. The method of claim 1, comprising: prior to said operation of synchronizing state information between the version modified process and a second process: changing the role of the original version process from an active role to a standby role, and changing the role of the second process from a standby role to an active role.

3. The method of claim 2, wherein said operations of changing the role of the original version process, instantiating the version modified process, synchronizing state information between the version modified process and the second process and in response to the version modified process being ready to take over an active role being performed by the second process, configuring the version modified process to take over an active role being performed by the second process instead of the original version process and ceasing said operating of the original version process are performed as a result of an initiating of an operation for changing from the original version process to the version modified process.

4. The method of claim 1, wherein said operations of instantiating the version modified process, synchronizing state information between the version modified process and the second process and in response to the version modified process being ready to take over an active role being performed by the second process, configuring the version modified process to take over an active role being performed by the second process instead of the original version process and ceasing said operating of the original version process are performed as a result of an initiating of an operation for changing from the original version process to the version modified process.

5. The method of claim 1, wherein the second process is operating in a virtual machine on the second hardware unit.

6. The method of claim 1, wherein the second virtual machine is operating a modified version of an operating system kernel which is different than an original version of the operating system kernel operating in the first virtual machine.

7. The method of claim 1, wherein the second virtual machine is operating an operating system kernel that is different than the operating system kernel operating in the first virtual machine.

8. A method, comprising:
for each particular first process of one or more first processes operating in a first virtual machine on a first hardware unit: changing the role of said particular first process from an active role to a standby role, and changing the role of a second process, of one or more second processes on a hardware unit different than the first hardware unit, corresponding to said particular first process from a standby role to an active role;
instantiating a third process corresponding to each of said one or more first processes resulting in one or more third processes in a standby role on a second virtual machine on the first hardware unit concurrently running with said one or more first processes operating in the first virtual machine on the first hardware unit in a standby role; and
synchronizing state information between corresponding processes of said one or more third processes and said one or more second processes to enable said one or more third processes to be able to take over an active role being performed by a corresponding one of said one or more second processes;
wherein said operation of synchronizing state information is performed after said operations of changing the role.

9. The method of claim 8, comprising: ceasing said operating of each identifiable first process of said one or more first processes in response to a corresponding one of said one or more third processes being able to take over an active role being performed by a corresponding one of said one or more second processes.

10. The method of claim 8, comprising:
instantiating a fourth process in the second virtual machine corresponding to a current standby process operating in the first virtual machine and a current active process operating in a hardware unit different than the first hardware unit; and synchronizing state information between the fourth process and the current active process; and
ceasing said operating of the current standby process in response based on the fourth process being able to take over the active role being performed by the current active process.

11. The method of claim 8, wherein at least one of said one or more third processes corresponds to a different version of a corresponding one of said one or more first processes.

12. The method of claim 8, wherein said operations of changing the role, and said operations of instantiating said one or more third processes and said synchronizing state information are performed as a result of an initiating of an operation for changing from said one or more first processes to said one or more third processes.

13. The method of claim 8, comprising concurrently with said operation of synchronizing state information between corresponding processes of said one or more third processes and said one or more second processes: synchronizing state information between corresponding processes of said one or more first processes and said one or more second processes.

14. The method of claim 8, wherein the second virtual machine is operating a modified version of an operating system kernel which is different than an original version of the operating system kernel operating in the first virtual machine.

15. The method of claim 14, comprising:
instantiating the second virtual machine prior to said operation of instantiating said one or more third processes; and
ceasing operation of said first virtual machine in response to all of said one of said one or more third processes being able to take over an active role being performed by a corresponding one of said one or more second processes.

16. The method of claim 8, wherein the second virtual machine is operating an operating system kernel that is different than the operating system kernel operating in the first virtual machine.

17. The method of claim 8, wherein said one or more first processes includes at least two processes.

18. An apparatus, comprising:
a first hardware unit, including: memory; and one or more processing elements; and
a second hardware unit, including: memory; and one or more processing elements;
wherein the second hardware unit is configured to operate a second process operating in an active role;
wherein the first hardware unit is configured to: operate a first virtual machine including an original version process in a standby role, to operate a second virtual machine, and to instantiate a version modified process in a standby role in the second virtual machine, wherein the version modified process corresponds to a different version of the original version process, and wherein the original version process and version modified process operate simultaneously;

wherein the version modified process is configured to synchronize state information with the second process while the original version process is still configured to take over an active role in place of the second process, such that in response to the version modified process being able to perform an active role in place of the second process, making the version modified process the standby process to take over for the second process instead of the original version process.

19. The apparatus of claim 18, wherein the second virtual machine is operating an operating system kernel that is a different version of an operating system kernel operating in the first virtual machine, or is a different operating system than that of the operating system kernel operating in the first virtual machine.

20. The apparatus of claim 18, comprising the version modified process taking over the active role being performed by the second process.

21. The apparatus of claim 18, wherein said making the version modified process the standby process to take over for the second process instead of the original version process includes ceasing the operation of the original version process.

22. The method of claim 1, comprising the version modified process taking over the active role being performed by the second process.

* * * * *

UNITED STATES PATENT AND TRADEMARK OFFICE
CERTIFICATE OF CORRECTION

PATENT NO. : 9,020,894 B2  
APPLICATION NO. : 13/357513  
DATED : April 28, 2015  
INVENTOR(S) : Ammanur et al.

Page 1 of 1

It is certified that error appears in the above-identified patent and that said Letters Patent is hereby corrected as shown below:

Title Page

TITLE OF PATENT, "Service" should be – In Service –

Signed and Sealed this  
Twenty-third Day of February, 2016

Michelle K. Lee  
*Director of the United States Patent and Trademark Office*